United States Patent
Seely et al.

(10) Patent No.: US 10,405,044 B1
(45) Date of Patent: Sep. 3, 2019

(54) CONTENT NOTIFICATION SYSTEM AND METHOD

(71) Applicant: Apple Inc., Cupertino, CA (US)

(72) Inventors: Blake Seely, San Francisco, CA (US); Benjamin W. Keighran, Menlo Park, CA (US); Christopher L. Oklota, San Francisco, CA (US); Guy Piekarz, Sunnyvale, CA (US); Sandip M. Chokshi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/800,557

(22) Filed: Jul. 15, 2015

Related U.S. Application Data

(60) Provisional application No. 62/058,001, filed on Sep. 30, 2014.

(51) Int. Cl.
*H04N 21/435* (2011.01)
*H04N 21/466* (2011.01)

(52) U.S. Cl.
CPC ....... *H04N 21/4667* (2013.01); *H04N 21/435* (2013.01)

(58) Field of Classification Search
CPC .. H04N 21/4667; H04N 21/435; H04L 67/10; H04L 12/18; H04L 12/189; H04L 29/08
USPC ...................................... 725/32, 34
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Nathan J Flynn
*Assistant Examiner* — Caroline Somera
(74) *Attorney, Agent, or Firm* — Dickinson Wright RLLP

(57) ABSTRACT

A method of providing a notification to a client device is disclosed. The method includes, for example, obtaining data associated with the client device with respect to content provided by a plurality of content sources; creating a viewing preference profile for the client device based on the obtained data, the user preference profile indicating content preferred by the client device; detecting a triggering event concerning a digital content; and in response to the triggering event, determining whether to trigger a notification to the client device based on the viewing preference profile.

23 Claims, 3 Drawing Sheets

(56) References Cited

U.S. PATENT DOCUMENTS

| | | | |
|---|---|---|---|
| 8,479,122 B2 | 7/2013 | Hotelling et al. | |
| 8,776,149 B1* | 7/2014 | Koch | H04N 21/4334 725/37 |
| 2006/0197753 A1 | 9/2006 | Hotelling | |
| 2008/0134043 A1* | 6/2008 | Georgis | G06F 17/30035 715/733 |
| 2010/0313250 A1* | 12/2010 | Chow | G06F 17/30899 726/5 |
| 2011/0246566 A1* | 10/2011 | Kashef | G06F 17/30035 709/203 |
| 2012/0117471 A1* | 5/2012 | Amidon | H04N 5/76 715/716 |
| 2012/0311637 A1* | 12/2012 | Anthru | H04N 5/445 725/44 |
| 2013/0086110 A1* | 4/2013 | Kruger | G06F 17/30867 707/770 |
| 2013/0091215 A1* | 4/2013 | Funk | G06Q 30/0639 709/204 |
| 2013/0188927 A1* | 7/2013 | Seryakov | H04N 21/2543 386/248 |
| 2014/0059647 A1* | 2/2014 | Immonen | H04L 63/102 726/3 |
| 2014/0130182 A1* | 5/2014 | Yackanich | G06F 21/60 726/27 |
| 2014/0215507 A1* | 7/2014 | Wouhaybi | G06Q 30/02 725/14 |
| 2014/0282709 A1* | 9/2014 | Hardy | H04N 21/44222 725/34 |
| 2014/0300465 A1* | 10/2014 | Putterman | G08B 27/008 340/531 |
| 2015/0074540 A1* | 3/2015 | Moritomo | H04W 48/16 715/739 |
| 2015/0382062 A1* | 12/2015 | Sivaraman | H04N 21/47214 725/50 |
| 2016/0119678 A1* | 4/2016 | Odryna | H04N 21/4622 725/49 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

CONTENT NOTIFICATION SYSTEM AND METHOD

CROSS-REFERENCE TO RELATED APPLICATIONS

This application is related to and claims the benefit of U.S. Provisional Application Ser. No. 62/058,001 filed Sep. 30, 2014, entitled "Notification System and Method", the entire disclosure of which is herein incorporated by reference in their entirety for all purposes.

FIELD OF THE DISCLOSURE

This relates generally to delivering digital content over a network, and more particularly, to systems and methods of sending notifications to a user's device about content that may be of interest to the user.

BACKGROUND

Most viewers of television (TV) shows, movies, or other types of content tend to develop viewing preferences and habits over a period of time based on their personal interests. For example, a baseball fan from San Francisco would be interested in watching a San Francisco Giants game. A fan of the TV show, Game of Thrones would be interested in catching a new episode of the show. However, the vast amount of content available on TV and the Internet makes it difficult for a viewer to know about every program that may interest him Finding the right program to watch often requires the viewer to manually search through numerous channels or a large content database, which can be both inefficient and ineffective.

SUMMARY

This generally relates to providing personalized notifications to a user about content that may interest him. The notifications can be triggered based on knowledge about the user and the available content in response to one or more triggering events or conditions. For example, a notification can be triggered by new content that matches the user's viewing preferences and/or habits. A notification can also be triggered when a previously-selected program is about to start or expire. A notification can also be triggered when a live program reaches a certain level of interest. Other non-content specific events such as an emergency broadcast, traffic news, and weather alert can also trigger notifications to the user. The notification can be displayed on a user device (e.g., a digital media player) and, optionally, serve as an interactive user menu for the user to, for example access the recommended content. Essentially, the systems and methods of the disclosure can provide an intelligent way of automatically notifying a user about content or programming that may be of interest to him in a timely fashion.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This disclosure generally relates to providing personalized notifications to a user about content that may interest him. The notifications can be triggered based on knowledge about the user and the available content in response to one or more triggering events or conditions. For example, a notification can be triggered by new content that matches the user's viewing preferences and/or habits. A notification can also be triggered when a previously-selected program is about to start or expire. A notification can also be triggered when a live program reaches a certain level of interest. Other non-content specific events such as an emergency broadcast, traffic news, and weather alert can also trigger notifications to the user. The notification can be displayed on a user device (e.g., a digital media player, a personal computer, a laptop, a tablet computer, or a smartphone) and, optionally, serve as an interactive user menu for the user to, for example access the recommended content. Essentially, the systems and methods of the disclosure can provide an intelligent way of automatically notifying a user about content or programming that may be of interest to him in a timely fashion.

As referred to in this document, "content" can refer to any type of electronic content including digital media content in the form of video, audio, image, text, and/or multimedia content. The terms "content," "program," "programming," and "show," are used interchangeably in this document. Although the embodiments are described with reference to multimedia content such as TV shows, movies, and sports programs, it should be understood that the disclosure is not limited in any way to only these types of content.

Figure 1:
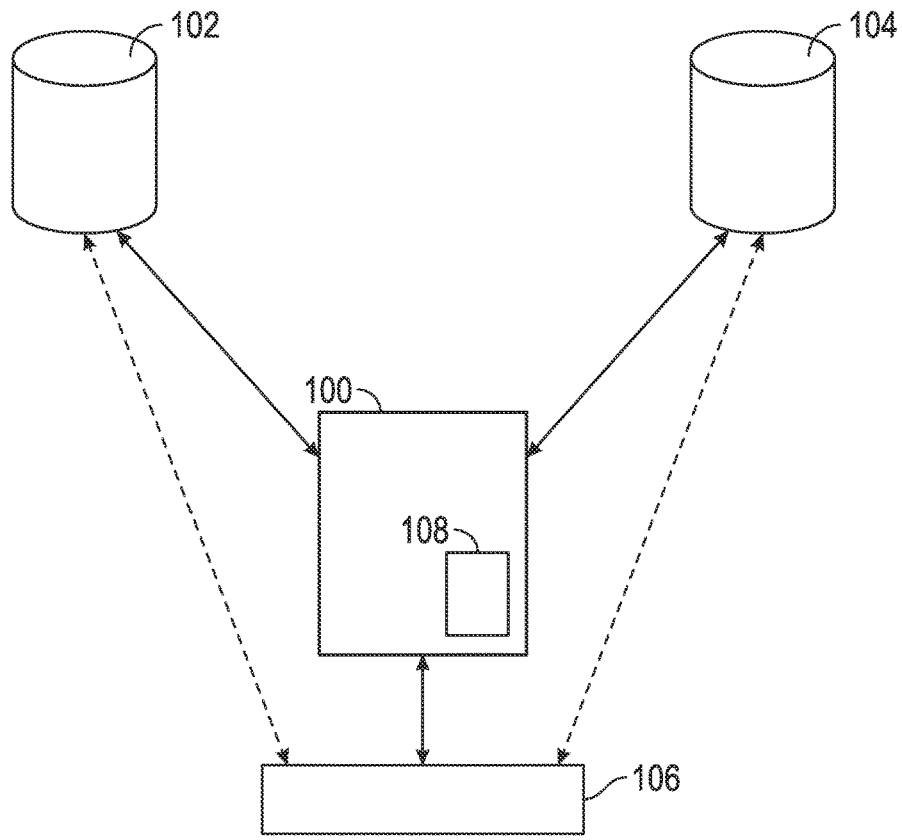
FIG. 1 illustrates an exemplary network of devices, according to an embodiment of the disclosure.

A brief overview of an exemplary content delivering/notification triggering system is first discussed. FIG. 1 illustrates an exemplary network of multiple devices including a client device 106, a central server 100, and multiple content sources 102, 104, according to an embodiment of the disclosure. The client device 106 can request and receive content from content sources 102, 104, either directly or through the central server 100. In addition to facilitating content delivering, the central server 100 can also collect and store information about the individual users and/or the content offered by the content sources. The central server 100 can also be programmed to monitor for certain events and/or conditions and, when one of these events or conditions occurs, trigger a notification to be sent to the client device 106.

The client device 106 can be any network-enabled electronic device capable of communicating with other devices on the network. For example, the client device 106 can be a digital media player (e.g., Apple TV, Roku), personal computer (PC), Mac, tablet PC (e.g., iPad), smartphone (e.g., iPhone, Android phone), electronic reader, video game console (e.g., PlayStation), or smart TV. The client device 106 can allow a user to view digital content provided by the various content sources 102, 104 on the network.

In one embodiment, the client device 106 can be a digital media player that supports various video, audio, and picture formats and allows the user to download and/or stream movies, TV shows, live sports games, and other digital media content from content sources 102, 104. The digital media player can have one or more software applications (apps) installed for obtaining content from the various sources. For example, the digital media player can include an app for accessing content provided by an on-demand streaming media content provider (e.g., Netflix). Additionally or alternatively, the digital media player can have a separate app for accessing a video sharing website (e.g., YouTube). Additionally or alternatively, an app can be used for accessing a particular cable TV channel (e.g., HBO or ESPN). Additionally or alternatively, an app can be used for accessing content offered by an online media library/store (e.g., iTunes). In some embodiments, multiple content sources can be accessed using a single app or interface on the digital media player. The single app or interface can provide a universal interface that allows the user to browse and/or search for content from all content sources.

In addition to the apps for obtaining digital media content, the client device 106 can include other applications (e.g., a web browser) designed to provide additional functions to the users.

In one embodiment, the client device 106 can require a user to register and log in before using the device 106. This can allow the client device 106 (and/or other devices on the network such as the central server 100) to track user-specific data pertaining to each individual user instead of or in addition to data pertaining to a client device. Additionally or alternatively, the user-specific and/or client device-specific data can be tracked on an app-by-app basis. For example, an individual user's (or the device's) viewing histories associated with Netflix and HBO can be tracked separately.

Although only one client device 106 is shown in FIG. 1, it should be understood that any number of client devices (of the same type or different types) can be connected to the system and each device configured to perform the same operations described in the various embodiments of the disclosure. The client device 106 can include (or be connected to) certain I/O devices such as a display for displaying notifications to the user.

Referring back to FIG. 1, each content source 102, 104 can be any computing device capable of providing digital content for download and/or streaming to one or more client devices connected to a network. For example, content source 102 can be an on-demand internet streaming media server (e.g., a Netflix server). Content source 104 can be a video-sharing service provider (e.g., YouTube). Other content sources including, but are not limited to, cable TV channel providers (e.g., HBO, ESPN), and online digital media stores (e.g., iTunes) can also be connected to the network. Although only two content sources 102, 104 are shown in FIG. 1, it should be understood that any number of content sources can be connected to the network.

The content provided by the content sources can include digital media content such as movies, TV shows, live sports games, concerts, music, images, etc. Some content sources (e.g., an on-demand internet streaming media provider) can require a membership (paid or unpaid) for a user to access its content. Others (e.g., a video-sharing website) can be open to the public.

The central server 100 of FIG. 1 can be connected to the content sources 102, 104 and the client device 106. The central server 100 can facilitate the delivering of content from the content sources 102, 104 to the client device 106.

In addition, the central server 100 can also trigger notifications for the client device 106 regarding a program, show, or event that may interest a user.

With respect to facilitating content delivery, in one embodiment, the central server 100 can receive requests for content from client device 106. The central server 100 can determine which of the content sources 102, 104 can provide the requested content and forward the request to that content source. The actual transmission of the content may or may not go through the central server 100. When the requested content is available from more than one content source, the central server can transmit a list of the content sources to the client device 106 for the user to choose the content source from which to download or stream the content. Alternatively, the central server can automatically select one of the content sources without user intervention. This automatic selection can be based on, for example, whether the user is entitled to access the content from a particular content source, the cost associated with obtaining the content from each content source, and/or the download/streaming speed associated with each content source. After a content source is selected, the content can be delivered from the content source 102, 104 either directly to the client device 106 or indirectly through the central server 100.

Additionally, the central server 100 can track and store information that can be used for determining what content would be of interest to each user. For example, the central server can track the viewing history associated with a particular user (based on user login information) or a client device. The viewing history can include content streamed and/or downloaded from one or more content sources. In one embodiment, the viewing history can be stored in a database 108 on the central server 100. The database 108 can also store other information relating to the user's viewing habits including, but not limited to, the frequency at which the user watches a particular show, the average duration of the user's viewing sessions, the movie genre most watched by the user, and the content source most frequently accessed by the user. The database 108 can be designed to store this information for each client device and/or each user.

Additionally or alternatively, the central server 100 can also track in the database 108 one or more programs that are on the user's watch list(s). The one or more programs can include, for example, a pre-ordered pay-per-view event, on-demand content that is available for a limited period of time, a complete season or series of a TV show, or any other digital media content offered by the content sources 102, 104. In one embodiment, the central server 100 can access the user's watch lists at the different content sources 102, 104 (e.g., the user's Netflix queue and favorite channels on YouTube). Optionally, the central server can centrally maintain a list combining the entries from the multiple watch lists.

Additionally or alternatively, the database 108 on the central server 100 can also store information relating to content offered by the content sources 102, 104. For example, the database 108 can store information such as the genre, director, leading actor/actress, and releasing date associated with a movie. In one embodiment, this information can be extracted from the metadata associated with the content.

Additionally or alternatively, the central server 100 can monitor the other devices on the network for events that may trigger a notification to be sent to the client device 106. For example, the central server can monitor what program is being watched on the client device 106 and use this information to determine if there are other similar or related programs to notify the user about.

Additionally or alternatively, the central server 100 can monitor for upcoming programs that may fit a user's viewing preferences. In one embodiment, the central server can monitor the electronic programming guides (EPGs) of the content sources 102, 104 to look for content that fit the user's preferences. The scheduled starting times provided by the EPGs can be used for determining when a notification is to be sent to the client device 106.

Additionally or alternatively, the central server 100 can also monitor for changes in content availability. For example, a newly-added TV show can trigger a notification to the user if the TV show matches the user's viewing preferences. An approaching expiration date of an existing program can also trigger a notification to remind the user to watch the program before it becomes unavailable.

Additionally or alternatively, the central server 100 can monitor the interest level of a live broadcast (e.g., a live baseball game). When the interest level of the event reaches a certain level (e.g., a threshold), a notification can be sent to the user to inform him about the event.

Additionally or alternatively, the central server 100 can receive information from sources other than the content sources 102, 104. For example, the central server 100 can receive, for example, severe weather alerts, traffic information, emergency broadcast, crime alerts, Amber alerts from various sources and determine, in response, whether the information is relevant to the user and whether a notification should be sent to the user's client device 106.

In some embodiments, the central server 100 can have its own content repository and also serve as a content source to the client devices. Client device 106 can request content from the central server's repository in a similar fashion as it would from content sources 102, 104.

It should be understood that, in some embodiments, some or all of the above-discussed functions of the central server 100 can be performed at the client device 106. At least some of the user and content data can also be stored on the client device. In some embodiments, the central server can be eliminated and notifications can be triggered locally at each client device.

Figure 2:
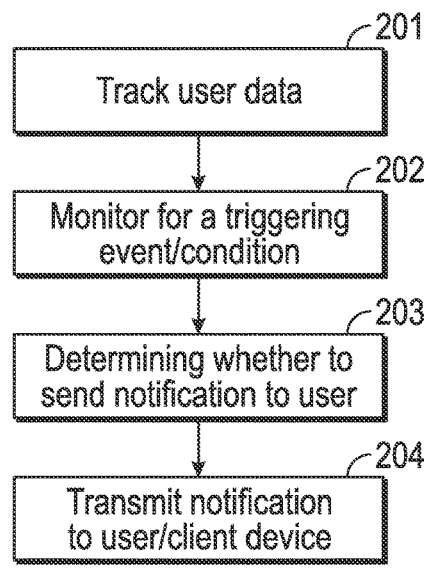
FIG. 2 is a flow chart illustrating the exemplary steps in a method of triggering a notification for a particular user/client device, according to an embodiment of the disclosure.

FIG. 2 is a flow chart illustrating the exemplary steps in a method of triggering a notification to be displayed on a client device, according to an embodiment of the disclosure.

The illustrated method can involve tracking user data such as viewing preferences/habits associated with a particular user and/or client device (step 201). The viewing preferences/habits can be ascertained from, for example, the user's viewing history and/or watch list(s). Additionally or alternatively, the central server can track the user's online behavior including, but are not limited to, the user's web-browsing habits and social media activities (e.g., the user's Twitter "follows" and Facebook "likes"). Additionally or alternatively, the central server can also track other data relating to the user including, for example, the location of the user (or the client device). Some or all of this data can be used for determining what content would interest the user.

Next, the central server can monitor for a triggering event/condition that can trigger a notification to be sent to the client device (step 202). In response to detecting a triggering event/condition, the central server can determine whether a notification should be sent to a user to inform him about content or programming that may interest him (step 203).

One exemplary triggering event/condition can be, for example, when new content that matches a user's viewing preferences/habits becomes available. First, the central server can determine, based on, the user data collected in step 201, whether the newly-added content matches a user's viewing preferences. For example, if the user's viewing history reveals that he is a baseball fan and, in particular, a San Francisco Giants fan, it can be determined that he would be interested in watching the next Giants game or games that have some importance to the Giants (e.g., games with division rivals, playoff games, games critical to the Giants' standing in the division, games that have playoff implications). As another example, if the user has been watching the past seasons of the TV show, Game of Thrones, it can be determined that he would be interested in watching a new season of the show when it becomes available.

In one embodiment, the central server can monitor the various content sources for upcoming Giants games/Game of Thrones episodes. This can be done by, for example, monitoring the electronic program guide (EPG) associated with each content source or monitoring a program or content catalog associated with the content source. A notification can be sent to the client device when an upcoming game/episode appears in one of the EPGs.

In addition to determining whether newly-added content is of interest to the user, the central server can also determine whether the user is entitled to access the content. For example, a Netflix subscriber can access all content offered by Netflix, but the same user may not be entitled to watch any HBO content if he does not have a subscription to HBO. Accordingly, when a TV show (e.g., Game of Thrones) is shown on HBO, the user may not receive a notification even if the show matches his viewing habits. But when the same show is added to Netflix, a notification can be triggered to inform the user that Game of Thrones is available for viewing on Netflix. Some content can be made available to all users (e.g., a YouTube clip) and, thus, rendering the step of verifying user entitlement optional.

Additionally or alternatively, a triggering event/condition can be when previously-purchased content or content in the user's watch list is about to expire. For example, the user may have a free trial subscription to HBO for a predetermined period of time. The central server can track how much time is left in the trial period. A triggering event/condition can be, for example, when the server is notified that the trial period is about to run out. Similarly, when previously-purchased content or content in the user's watch list is about to expire, a notification can be triggered as a reminder for the user to watch the content.

Another triggering event/condition can be, for example, when the interest level of a program reaches a threshold. In one embodiment, the central server can monitor the interest level of a program being broadcast live by a content source. The interest level of the program can be objectively determined based on, for example, one or more events taking place during the program. For example, if the program is a baseball game, the interest level of the game can change based on, for example, the score of the game, individual performance of a player, number of highlights in the game, etc. The interest level can rise when, for example, the bases are loaded at the bottom of the ninth inning or a pitcher is about to complete a no-hitter. In contrast, if the score is lopsided, the interest level of the game can be lowered. When the interest level reaches a certain threshold, the server can trigger a notification to recommend the game to users who are sports fans. A similar example can be a surprise appearance of a guest on a TV show. This can trigger a notification to users who are fans of the guest.

Additionally or alternatively, a notification can be triggered in response to certain alerts (e.g., a severe weather alert, crime alert). These alerts can be received from sources other than the content sources on the network. In addition, the notification can be triggered in response to content that is trending on social media or large number of viewers. For example, if it is determined that many users are watching a particular program (e.g., Oscar Awards) or that the particular program is trending on social media, a notification that recommends the program to the users that have demonstrated an interest in the program (e.g., people that tend to watch movies). The central server can determine, based on a user's location, whether he should receive a notification regarding the alert.

After a triggering event/condition is detected and the server determines that a notification should be generated in response to the event/condition, the server can then push the notification to one or more client devices (step 204). In one embodiment, the central server can optionally determine an optimal time for sending the notification. For example, notification for a live event can be sent as soon as the interest level of the event reaches a threshold. Notification for a scheduled program can be sent, for example, shortly before its scheduled starting time.

After the notification is received by the client device (e.g., a digital media player), the notification can be displayed on a display or output by any other suitable means. In one embodiment, the notification can be displayed in the form of an overlay on top of the program being viewed on the client device. In other embodiments, the notification can be displayed in other forms and at any location on the display screen of the client device. In some embodiments, the notification can be output through a speaker/headphone in addition to or as an alternative of being displayed on the screen. In some embodiments, the notification can be sent to one or more different types of client devices including, but not limited to, the user's digital media player, mobile phone, laptop, tablet PC, and wearable device. The notification can be in different forms, such as text message, multimedia message, audio message, banner alert, etc., that are suitable for output on each receiving client device. The user can register the client devices on which notifications are to be received. Alternatively, the one or more devices can be associated with a common user account (e.g., phone number, email address, Apple ID) so that the notification can be sent to the common user account and output on the client devices.

Optionally, the notification can include an interactive component which can offer one or more menu items for user selection. When the user sees the notification on the screen, he can select one of the menu items to, for example, switch to the channel on which the recommended content is being shown. The user can also have the option of starting recording (or scheduling a recording of) the recommended program in a storage medium for later viewing. Or the user can simply dismiss the notification.

Although steps 201-203 of FIG. 2 can be performed by a server (e.g., central server 100 of FIG. 1), as described above, it should be understood that, in other embodiments, one or more of these steps can be performed by a client device. In some embodiments, all three steps of FIG. 2 can be performed at a client device.

Figure 3:
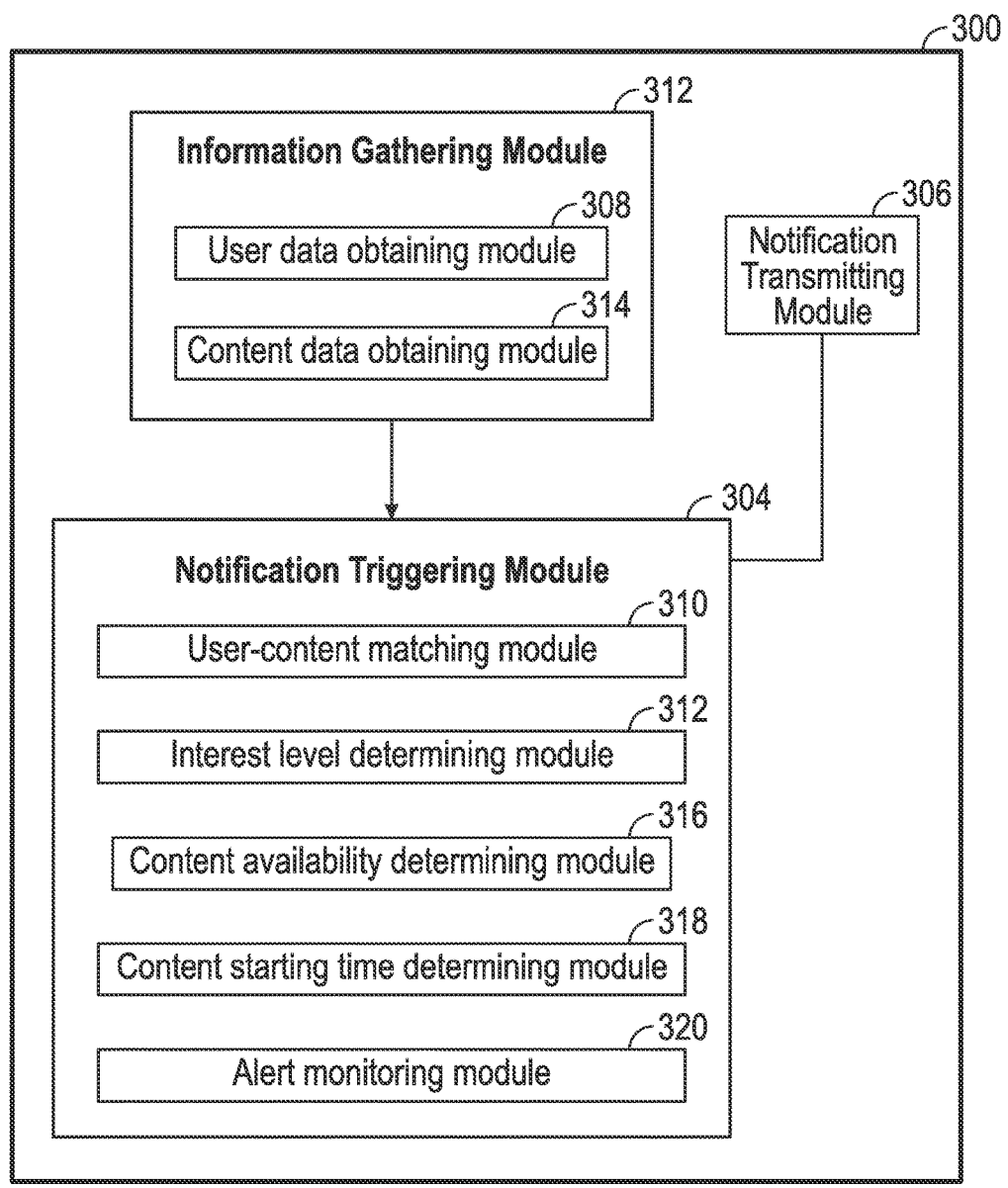
FIG. 3 is a block diagram illustrating the exemplary modules of a server, according to an embodiment of the disclosure.

FIG. 3 is a block diagram illustrating the exemplary module of a server 300 (e.g., the central server 100 of FIG. 1). The server 300 can include, for example, an information gathering module 302, a notification triggering module 304, and a notification transmitting module 306. The information gathering module 302 can be designed to gather information relating to the individual users, client devices, and/or content. The notification triggering module 304 can detect a triggering event/condition that can trigger a notification to be sent to a user/client device. The notification transmitting module 306 can transmit the notification to the client device.

In the server of FIG. 3, the information gathering module 302 can include, for example, a user data obtaining module 308 and a content data obtaining module 314. The user data obtaining module 308 can collect information including, but not limited to, for example, the viewing history, watch list(s), entitlements, and location information associated with one or more users and/or client devices. The content data obtaining module 314 can obtain content data relating to the programs and shows made available by the content sources. The content data can include, for example, a list of content offered by each content source and information such as the title, genre, actors, director, and releasing date specific to each piece of content on the list.

The notification triggering module 304 can include programming logic for detecting a triggering event/condition and determining whether to generate a notification in response to the detected triggering event/condition. The notification triggering module 304 can include one or more modules for detecting various types of triggering events/conditions. In the embodiment shown in FIG. 3, the notification triggering module 304 can include, for example, a user-content matching module 310, an interest level determining module 312, a content availability determining module 316, a content starting time determining module 318, and an alert monitoring module 320. The user-content matching module 310 can match content to a user based on the user's viewing preferences and habits. The interest level determining module 312 can determine the interest level of a live program. The content availability determining module 316 can determine the availability of a piece of content at the various content sources and/or detect any changes in content availability (e.g., new content being added and existing content being removed) that may trigger a notification to one or more users. The content starting time determining module 318 can determine the scheduled starting time of a show/program which can be used for determining the best time for sending out a notification. The alert monitoring module 320 can receive alerts and other information from various sources.

In response to detecting a triggering event, the notification triggering module 304 can generate a notification for notifying one or more users about content or programming that may interest them. The notification transmitting module 306 can then transmit the notification to the users' client devices.

It should be understood that one or more of the modules shown in FIG. 3 can be optional and additional modules can be included in the server 300.

In some embodiments, one or more of the modules of server 300 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 4:
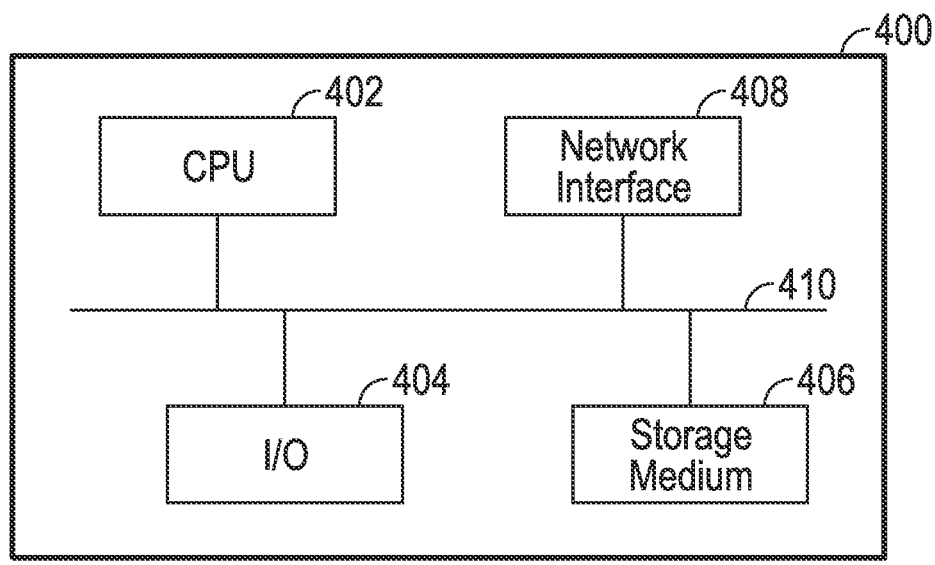
FIG. 4 illustrates exemplary components of a computing system such as the central server described in the embodiments of the disclosure.

The non-transitory computer readable storage medium can be part of a computing system serving as the server or the client device. FIG. 4 illustrates exemplary common components of one such computing system. As illustrated, the system 400 can include a central processing unit (CPU) 402, I/O components 404 including, but not limited to one or more of display, keypad, touch screen, speaker, and microphone, storage medium 406 such as the ones listed in the last paragraph, and network interface 408, all of which can be connected to each other via a system bus 410. The storage medium 406 can include the modules of FIG. 3.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method comprising:
    obtaining data associated with a client device with respect to streaming media content accessible via a plurality of content applications installed on the client device, the plurality of content applications including a first content application for obtaining streaming media content on the client device from a first content source, and a second content application, different from the first content application, for obtaining streaming media content on the client device from a second content source, different from the first content source, wherein obtaining the data includes obtaining data from the first content application and obtaining data from the second content application;
    creating a viewing preference profile for the client device based on the obtained data, the viewing preference profile indicating content preferred by the client device, wherein creating the viewing preference profile comprises, on the client device, combining the data obtained from the first content application and the data obtained from the second content application;
    monitoring the streaming media content accessible via the first and second content applications of the plurality of content applications installed on the client device;
    detecting a triggering event associated with at least one of an interest level associated with the streaming media content being above a threshold, a change in content availability with respect to the streaming media content, and an alert from a network;
    in response to the triggering event, determining whether to trigger a notification at the client device based on the viewing preference profile;
    while displaying the notification on the client device, receiving a request to view the streaming media content; and
    in response to receiving the request to view the streaming media content, automatically selecting a given content application of the plurality of applications to provide the streaming media content at the client device, wherein the streaming media content is available on multiple content applications of the plurality of content applications.

2. The method of claim 1, wherein the data comprises a viewing history associated with the client device.

3. The method of claim 2, wherein the viewing history comprises at least one of a frequency at which one type of content is streamed to the client device via the plurality of content applications, an average duration of a viewing session of the one type of content on the client device, a genre of content most watched on the client device via the plurality of content applications, and one of the content applications most frequently accessed by the client device.

4. The method of claim 1, wherein the data comprises a watch list associated with the client device.

5. The method of claim 1, wherein detecting a change in content availability comprises detecting new content being made available or an expiration of existing content.

6. The method of claim 1, wherein monitoring the streaming media content accessible via the plurality of content applications comprises monitoring one or more electronic programming guides (EPGs) of the plurality of content applications.

7. A system comprising:
one or more processors; and
memory storing instructions, which when executed by the one or more processors, cause the one or more processors to perform a method comprising:
obtaining data associated with a user with respect to streaming media content accessible via a plurality of content applications installed on a client device, the plurality of content applications including a first content application for obtaining streaming media content on the client device from a first content source, and a second content application, different from the first content application, for obtaining streaming media content on the client device from a second content source, different from the first content source, wherein obtaining the data includes obtaining data from the first content application and obtaining data from the second content application;
creating a viewing preference profile for the client device based on the obtained data, the viewing preference profile indicating content preferred by the client device, wherein creating the viewing preference profile comprises, on the client device, combining the data obtained from the first content application and the data obtained from the second content application;
monitoring the streaming media content accessible via the first and second content applications of the plurality of content applications installed on the client device;
detecting a triggering event associated with at least one of an interest level associated with the streaming media content being above a threshold, a change in content availability with respect to the streaming media content, and an alert from a network;
in response to the triggering event, determining whether to trigger a notification at the client device based on the viewing preference profile;
providing the notification at the client device;
after providing the notification at the client device and while displaying the notification on the client device, receiving a request to view the streaming media content; and
in response to receiving the request to view the streaming media content, automatically selecting a given content application of the plurality of applications to provide the streaming media content at the client device, wherein the streaming media content is available on multiple content applications of the plurality of content applications.

8. The system of claim 7, wherein the memory includes further instructions for performing:
matching content to the user based on the viewing preference profile;
determining an interest level of a live program;
determining a change in content availability via the first and second content applications of the plurality of content applications on the client device;
determining a starting time associated with a program; and
receiving alerts.

9. The system of claim 8, wherein the memory includes further instructions for performing triggering a notification when the interest level of the live program is determined to be above a threshold and the live program matches the viewing preference profile.

10. The system of claim 8, wherein the memory includes further instructions for performing triggering a notification in accordance with a determination that a new program matching the viewing preference profile has become available via at least one of the plurality of content applications on the client device.

11. The system of claim 8, wherein the memory includes further instructions for performing triggering a notification in accordance with a determination that a program from a watch list associated with the user is about to expire.

12. The system of claim 8, wherein the memory includes further instructions for performing triggering a notification in accordance with a determination that a scheduled starting time of a program is approaching.

13. The system of claim 8, wherein the memory includes further instructions for performing triggering a notification in response to receiving an alert concerning the user.

14. A method comprising:
monitoring an interest level of a program accessible from at least one of a plurality of content applications installed on a client device, the plurality of content applications including a first content application for obtaining streaming media content on the client device from a first content source, and a second content application, different from the first content application, for obtaining streaming media content on the client device from a second content source, different from the first content source;
determining if the program accessible via the content applications on the client device matches a viewing preference profile of a user, wherein the viewing preference profile is created by combining, on the client device, data obtained from the first content application and data obtained from the second content application;
providing a notification to the user if the program matches the viewing preference profile of the user and if the interest level of the program is above a predetermined threshold;
after providing the notification to the user and while displaying the notification on the client device, receiving a request to view the streaming media content; and
in response to receiving the request to view the streaming media content, automatically selecting a given content application of the plurality of applications to provide the streaming media content at the client device, wherein the streaming media content is available on multiple content applications of the plurality of content applications.

15. The method of claim 14, wherein monitoring the interest level of the program comprises detecting an event occurring during the program.

16. A system comprising:
one or more processors; and
memory storing instructions, which when executed by the one or more processors, cause the one or more processors to perform a method comprising:
monitoring an interest level of a program accessible from at least one of a plurality of content applications installed on a client device, the plurality of content applications including a first content application for obtaining streaming media content on the client device from a first content source, and a second content application, different from the first content application, for obtaining streaming media content on the client device from a second content source, different from the first content source;
determining if the program accessible via the content applications on the client device matches a viewing preference profile of a user, wherein the viewing preference profile is created by combining, on the client device, data obtained from the first content application and data obtained from the second content application;
providing a notification to the user if the program matches the viewing preference profile of the user and if the interest level of the program is above a predetermined threshold;
after providing the notification to the user and while displaying the notification on the client device, receiving a request to view the streaming media content; and
in response to receiving the request to view the streaming media content, automatically selecting a given content application of the plurality of applications to provide the streaming media content at the client device, wherein the streaming media content is available on multiple content applications of the plurality of content applications.

17. The method of claim 1, further comprising:
in accordance with a determination that the streaming media content is live content, providing the notification at the client device at a current time; and
in accordance with a determination that the streaming media content is scheduled at a future time, later than the current time, providing the notification at the client device at the future time.

18. The method of claim 1, wherein the plurality of content applications include one or more of a content application for accessing content from an on-demand streaming media content provider, a content application for accessing streaming media content from a content sharing website, a content application for accessing streaming media content from a particular television channel, and a content application for accessing streaming media content from an online content store.

19. The method of claim 1, wherein determining whether to trigger the notification at the client device comprises:
in accordance with a determination that the client device is entitled to access the streaming media content, triggering the notification at the client device; and
in accordance with a determination that the client device is not entitled to access the streaming media content, forgoing triggering the notification at the client device.

20. The method of claim 1, wherein the first content source is a first content provider and the second content source is a second content provider, different than the first content provider.

21. The system of claim 7, wherein the first content source is a first content provider and the second content source is a second content provider, different than the first content provider.

22. The method of claim 14, wherein the first content source is a first content provider and the second content source is a second content provider, different than the first content provider.

23. The system of claim 16, wherein the first content source is a first content provider and the second content source is a second content provider, different than the first content provider.

* * * * *